United States Patent [19]
Phan et al.

[11] Patent Number: 5,721,648
[45] Date of Patent: *Feb. 24, 1998

[54] MULTIRATE DIGITAL CONTROL SYSTEM FOR USE WITH A SYSTEM HAVING A LINEAR TRANSFER FUNCTION, SUCH AS A HEAD POSITIONING SYSTEM IN A MAGNETIC DISC DRIVE

[75] Inventors: Duc Tien Phan, Saratoga; Ich Pham, San Jose, both of Calif.

[73] Assignee: Seagate Technology, Inc., Scotts Valley, Calif.

[*] Notice: The term of this patent shall not extend beyond the expiration date of Pat. No. 5,369,345.

[21] Appl. No.: 589,791

[22] Filed: Jan. 22, 1996

Related U.S. Application Data

[63] Continuation of Ser. No. 224,472, Apr. 7, 1994, abandoned, and a continuation-in-part of Ser. No. 867,319, Apr. 10, 1992, Pat. No. 5,369,345.

[51] Int. Cl.$^6$ ........................................... G11B 5/55
[52] U.S. Cl. ............................ 360/78.09; 360/77.08
[58] Field of Search .................... 360/78.09, 77.04, 360/78.04, 77.08

[56] References Cited

U.S. PATENT DOCUMENTS

| | | | |
|---|---|---|---|
| 4,894,599 | 1/1990 | Ottesen et al. | 360/78.09 X |
| 5,144,549 | 9/1992 | Youcef-Toumi | 364/148 |
| 5,325,247 | 6/1994 | Ehrlich et al. | 360/78.09 |
| 5,369,345 | 11/1994 | Phan et al. | 360/78.09 X |
| 5,381,282 | 1/1995 | Arai et al. | 360/78.09 |
| 5,444,583 | 8/1995 | Ehrlich et al. | 360/78.09 |

OTHER PUBLICATIONS

Chiang, "Multirate State-Space Digital Controller for Sector Servo Systems," IEEE Proceedings of the 29th Conference on Decision and Control, Dec. 1990, pp. 1902–1907.

*Primary Examiner*—Aristotelis M. Psitos
*Assistant Examiner*—James L. Habermehl
*Attorney, Agent, or Firm*—Flehr Hohbach Test Albritton & Herbert, LLP

[57] ABSTRACT

A multirate sampled closed-loop digital servo system controls read/write head positioning in a magnetic disc storage device. Using a multirate estimator, positional data embedded in the storage medium is sampled once per sector, and inter-sector positional information is predicted. At least two control signals are provided per sample. The control signals are outputted at a multiple of the measurement sample rate, e.g., twice the sample rate. The estimator estimates head position and velocity, system and DC bias, and accounts for estimator calculation time delay, in the system and in the control updates. Estimated states are based on the measurement, control value, last control value, and last estimated states. Input information used by the estimator includes the digitized sampled position error signal (PES), the Gray code value, the present digital control value, and the last digital control value. At every sample, the present invention calculates the control values based upon estimated read/write head position and velocity, and the absolute position of the target track. Both present and last control values are used for the estimator to compensate for computational delay and for additional system phase lags. To minimize computational delay, the algorithm implementing the estimator and controller requires but one multiplication and one addition are necessary to calculate the control value. Once the heads are moved close to the desired target tracks, the servo operates closed-loop in track-follow mode.

22 Claims, 4 Drawing Sheets

MULTIRATE DIGITAL CONTROL SYSTEM FOR USE WITH A SYSTEM HAVING A LINEAR TRANSFER FUNCTION, SUCH AS A HEAD POSITIONING SYSTEM IN A MAGNETIC DISC DRIVE

CROSS-REFERENCE TO RELATED APPLICATION

This application is a continuation of U.S. patent application Ser. No. 08/224,472 filed Apr. 7, 1994 entitled "MULTIRATE DIGITAL CONTROL SYSTEM FOR USE WITH A SYSTEM HAVING A LINEAR TRANSFER FUNCTION, SUCH AS A HEAD POSITIONING SYSTEM IN A MAGNETIC DISC DRIVE" (now abandoned), and a continuation-in-part of application Ser. No. 08/867,319, filed on Apr. 10, 1992 now U.S. Pat. No. 5,369,345, issued Nov. 29, 1994, entitled "METHOD AND APPARATUS FOR ADAPTIVE CONTROL".

FIELD OF THE INVENTION

The invention relates to digital control systems in general, and more specifically to a multirate digital control system for in positioning read/write heads in a magnetic disc storage unit, and for use in other systems also having a linear transfer function.

BACKGROUND OF THE INVENTION

The preferred embodiment of the present invention is used to position the read/write heads (or transducers) in a magnetic disc drive. For that reason, the background of this invention will be described with respect to controlling read/write heads in such drives. However, the present invention may be used to control other systems having a linear transfer function.

As shown by FIG. 1, a conventional magnetic disc storage system 2 includes one or more magnetic storage platters or discs 4, 6 that are rotated with angular velocity ω by a spindle motor 8. Discs 4, 6 have respective upper and lower surfaces 4U, 4L, 6U, 6L upon which data may be magnetically written or read. More specifically, projecting arms of an actuator carriage 10 carry read/write heads (hereafter "heads") 12U, 12L, 14U, 14L that respectively read and/or write data from disc surfaces 4U, 4L, 6U, 6L. Actuator carriage 10 moves all heads in or out under command of a positioning servo controller mechanism 16. A flexible multiconductor cable (not shown) couples the actuator assembly 10 to the servo controller 16. Of course, assembly 2 is contained in a suitably sealed protective housing (not shown).

The various surfaces of discs 4, 6 are commonly formatted into concentric tracks, T1, T2, T3, etc., portions of which are defined as pie-shaped wedges or sectors, e.g., S1, S2, etc. As such, the various disc storage locations may be defined by disc number (e.g., disc 4), disc surface (e.g., 4U), track (or cylinder) number (e.g., T3) and sector number (e.g., sector S1).

System 2 is coupled to a host computer (not shown), which includes a disc drive interface (not shown). In response to commands issued by users of the host computer, or by a program under execution by the host computer, an appropriate disc drive interface command is issued. For example, such command may require the servo controller 16 to seek data or a storage location on one of the surfaces of a disc, e.g., disc 4, surface 4U, track T3, sector S2.

In response to this command, servo controller 16 actuates carriage 10 in a controlled fashion to move all heads 12U, 12L, 14U, 14L in unison over the disc surfaces until the heads are positioned over the desired target track, T3 in the example at hand. Since all heads on the carriage move together, system 2 includes control circuitry to select the proper read/write head to perform the desired data transfer function, head 12U in the present example. It is expected that system 2 should access data from the target within ten milliseconds or so. During track access, seek mode or track follow mode operations may be used.

In some storage systems, a dedicated disc surface, surface 4U for example, is provided upon which positional information is permanently embedded for use by servo mechanism 16. In such prior art dedicated servo drives, the dedicated disc surface holds pre-recorded servo data. By demodulating servo information pre-recorded in the disc surface, the appropriate heads permit a positional error signal ("PES") to be derived, which PES corresponds to head positional error from the intended track center. If sampled sufficiently rapidly, the quadrature signals permits derivation of track crossing information.

However, modern magnetic storage systems are characterized by smaller discs, whereon a higher density of data is to be reliably recorded and retrieved. For this reason, it is not always feasible to dedicate a disc surface for storage of positional data. In non-dedicated sector servo systems, wherein servo information is recorded interspersed with user data, track crossing information can not always be derived from the PES because the system must recognize each track crossing, and the read/write heads may cross many tracks between PES samples.

As noted, non-dedicated systems, with which the present invention is intended to be used, embeded positional information along with actual data on the various tracks on the various discs. This advantageously increases track density and reduces data overhead when compared to dedicated disc surface systems. Using the embedded data, the read heads sense the sector over which the heads are positioned. Servo system 16 then re-positions actuator carriage 10 until the heads are positioned over the desired target track, and sector thereon.

When servo system 16 operates digitally (as opposed to operating in analog mode), a tradeoff must be made between servo system bandwidth and data capacity necessary to sense positional information frequently enough to be useful. On one hand, the bandwidth should be large, which implies rapid response to positional errors. Understandably, as magnetic disc track density increases, a high track-following bandwidth is demanded. However, too large a bandwidth may require too much positional data to be processed in a given time frame.

Typically, in prior art systems such as depicted in FIG. 1, the embedded positional data are sampled once per sector, whereupon servo system 16 outputs positional information including PES, once per sector. Unfortunately, however, servo system 16 essentially operates blind between adjacent sector samples. The result is often reduced servo bandwidth, slow seek time, poor disturbance rejection, rough control and degraded acoustics.

It will be appreciated that even when processing data at the start of a sector, there will be a time delay before servo system 16 can output positional information to the actuator carriage 10. Prior art systems do not account for this computation delay time. Further, direct current ("DC") bias can cause servo system 16 to output signals that undesirably include a bias error. Such error can arise, for example, from the bias force from the actuator flexible cable, from gravitational force on the carriage assembly 10, and from electronic offsets in the circuitry comprising servo system 16, e.g., from output power amplifiers. Bias error can undesirably move the actuator and read/write heads away from the desired position during seek and track-following modes.

In summary, for use in positioning the heads in a magnetic disc assembly there is a need for a digital control system that can output positional information more often than once per sector, preferably without requiring sampling more than once per sector. Such system should not operate blindly between sector samples, but should output predicted intermediate positional information. Such control system should further include an algorithm to estimate head position and velocity, and system bias. Such intermediate predictive signals would permit such a system to control position in smoother steps. Finally, such system should compensate for computation delay, and also compensate for DC bias error, and operate in both seek and track-following modes.

The present invention discloses such a system, and a generalized method for implementing it use.

SUMMARY OF THE INVENTION

The present invention provides a multirate sampled closed-loop digital servo control system for use in controlling read/write head positioning in a magnetic disc storage device. Applicant's control system is a state-space design with a multirate estimator. The control system samples positional embedded data once per sector as in the prior art, but provides an estimator that predicts inter-sector positional information. As such, two or more control signals are output per sample. The control system is multirate, and updates the output signals at a rate that is a multiple of the measurement sample rate, the multiple being two preferably. A limited sample rate may be used that maximizes data capacity consistent with required servo bandwidth. The disclosed estimator algorithm estimates head position and velocity, and system bias, and takes account of the computation delay. The control signal also includes the effect of computation delay.

Although the estimator preferably pre-calculates much of the output control signal, estimator calculation time delay is accounted for in the system, as are control updates. Estimated states are calculated based on the measurement, the control value, the last control value, and the last estimated states. In seek mode track access, the heads are moved across the tracks, by having the estimated velocity follow an optimum velocity trajectory. Once the heads are moved close to the boundary of the desired target tracks, the servo operates closed-loop in track follow mode, whereupon the actuator is servo controlled to bring the center of the selected data head to align itself with the centerline of the desired track.

Input information used by the estimator includes the digitized sampled position error signal (PES), the Gray code value, the present digital control value, and the last digital control value. At every sample, the present invention calculates the control values based upon estimated read/write head position, velocity and bias, the absolute position of the target track, and the last control value. Both present and last control values are used for the estimator to compensate for computational delay and for additional system phase lags. To minimize computational delay, the algorithm implementing the estimator and controller requires but one multiplication and one addition are necessary to calculate the control value.

Further, the estimator compensates for DC bias, and can introduce phase lag to compensate for other system delays. Relatively smooth head positioning is provided, with improved acoustics during seek mode. Even under the constraint of a low servo sampling rate, the present invention improves control system performance, resulting in higher servo bandwidth, faster seek time, and better disturbance rejection. Because the present invention requires relatively fewer servo samples, hard disc format efficiency is promoted in that more storage area is available for non-servo data.

Other features and advantages of the invention will appear from the following description in which the preferred embodiment has been set forth in detail, in conjunction with the accompanying drawings.

DETAILED DESCRIPTION OF THE PREFERRED EMBODIMENT

Figure 1:
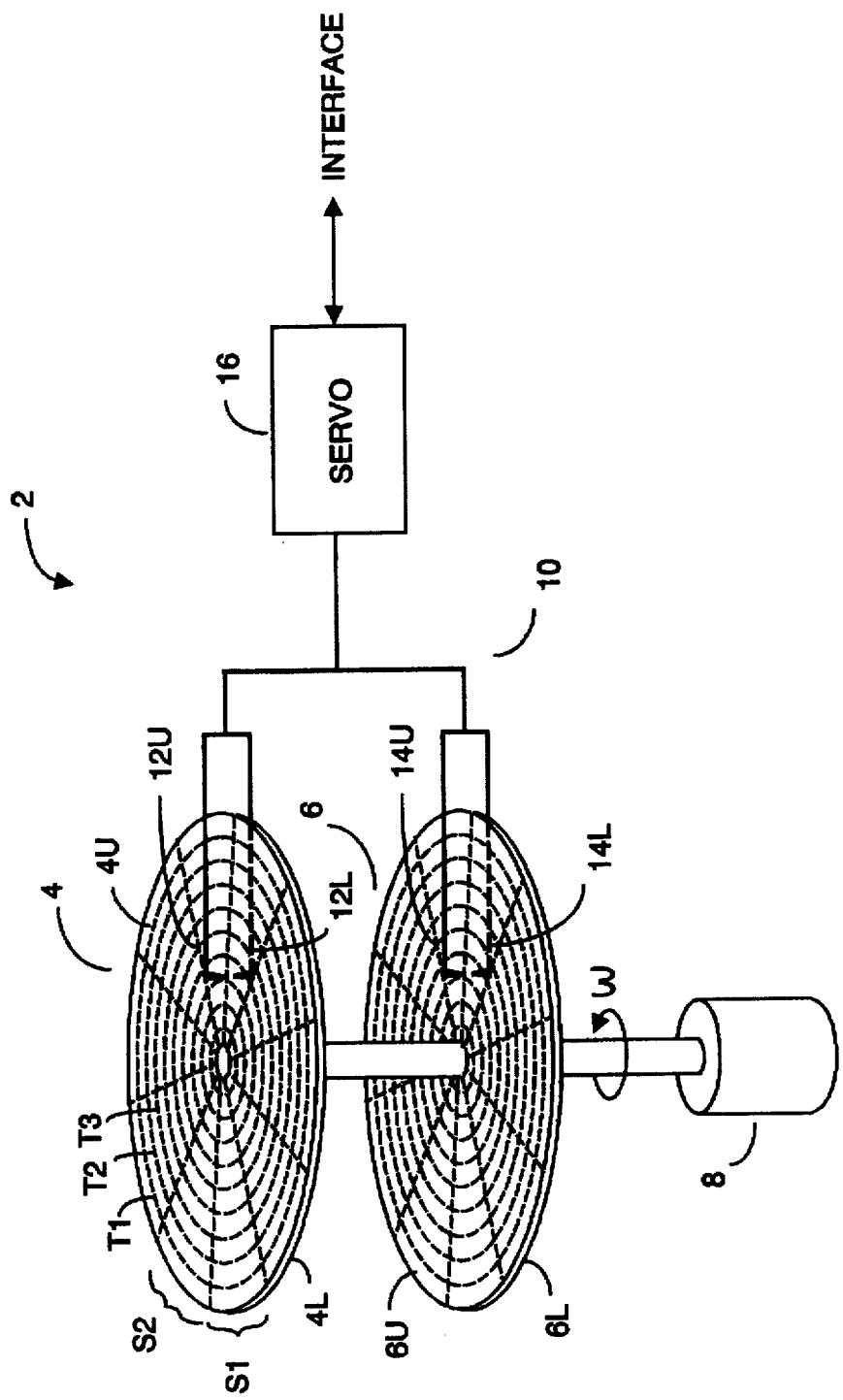
FIG. 1 depicts read/write head positioning in a magnetic disc storage unit, according to the prior art.

Although the preferred embodiment is described with respect to its use to position read/write heads in a magnetic disc storage system, the present invention may be used in any system whose "plant", e.g., mechanical components, may be modeled by a linear transfer function. (Non-linear plants are too difficult to model successfully.) While the preferred embodiment is described with respect to a digital sampled-data system, those skilled in the art will appreciate that applicant's methodology may be applied to control analog systems employing continuous signals, and to hybrid digital-analog systems.

In overview, the function of the control system is to seek the selected target track as rapidly as possible (seek mode), and then accurately position the selected read/write head over the selected track centerline (track-following mode). In seek mode, the heads are moved across the tracks by having the estimated velocity follow an optimum velocity trajectory. Once the heads move sufficiently close to the boundary of the desired target tracks, the servo operates in track-follow mode. The present invention includes system hardware, the multirate controller, and the estimator algorithm. The encoded information preferably includes a DC erase field that is pre-recorded at every sector on disc 4 (see FIG. 1), to signify the beginning of a sector. Following the erase field there is pre-recorded coarse track information, preferably in the form of Gray code, and fine track information in the form of two burst signals. To prevent erroneous detection of the DC erase field, a limit is usually placed on the maximum number of consecutive zeroes permitted to appear in the Gray code. As will be described, the DC erase field is detected from digital encoded read data by a so-called glue chip.

In the analysis that follows, applicant's multirate full-order estimator-based control system will be treated as a single-rate state space multi-input model, which permits analysis of the multirate system using standard single rate procedures.

In the preferred embodiment, the control effort is assumed to be a number generated by a digital controller such as a microprocessor. This control value is processed by the same digital servo controller. In contrast to prior art systems, the present invention outputs at least two control signals per sample: one control value based on measured position, and a second control value based on predicted position. Stated differently, prior art systems tend to sample frequently but to output but once per sample, the prior art essentially operating blindly between sectors. However, the present invention samples once per sector, but provides multiple output signals per each sample, based on measured positional information and predictive inter-sector information. Applicant's estimator is full-order, and uses both present and last control values to compensate for computational delay and for additional system phase lags.

In the preferred embodiment, the digital control system is a state-space design with a full-order estimator. Estimated states are calculated based upon measurement, present control value, last control value, and last estimated states.

Typically, the actuator is subject to low frequency bias components that undesirably move the actuator away from the desired position during track seek, and during track-following modes. Bias may include force from the flexible cable that is attached to the actuator coil, friction in the actuator bearings, windage due to air circulating inside the head disc assembly, gravitational force on the carriage assembly for a non-perfectly balanced actuator, and electronic offset in the system that causes a constant current to be applied to the actuator with zero control effort from the controller. The estimator estimates the bias that the dynamic system is subject to, and this estimated bias is subtracted from the control, thus removing the effect of the bias. The control values for a multirate digital control system described herein are updated at a rate r per sample period, where r is a positive integer>1.

Although computation delay is preferably minimized by pre-calculating much of the control signal, nonetheless the computational delay may have a significant effect that should be included in the design. Accordingly, the present design accounts for effects of delay in control action due to (without limitation) computation delay. The computation delay is accounted for both in the estimator, which calculates estimates, and also in the control/calculation.

Figure 2:
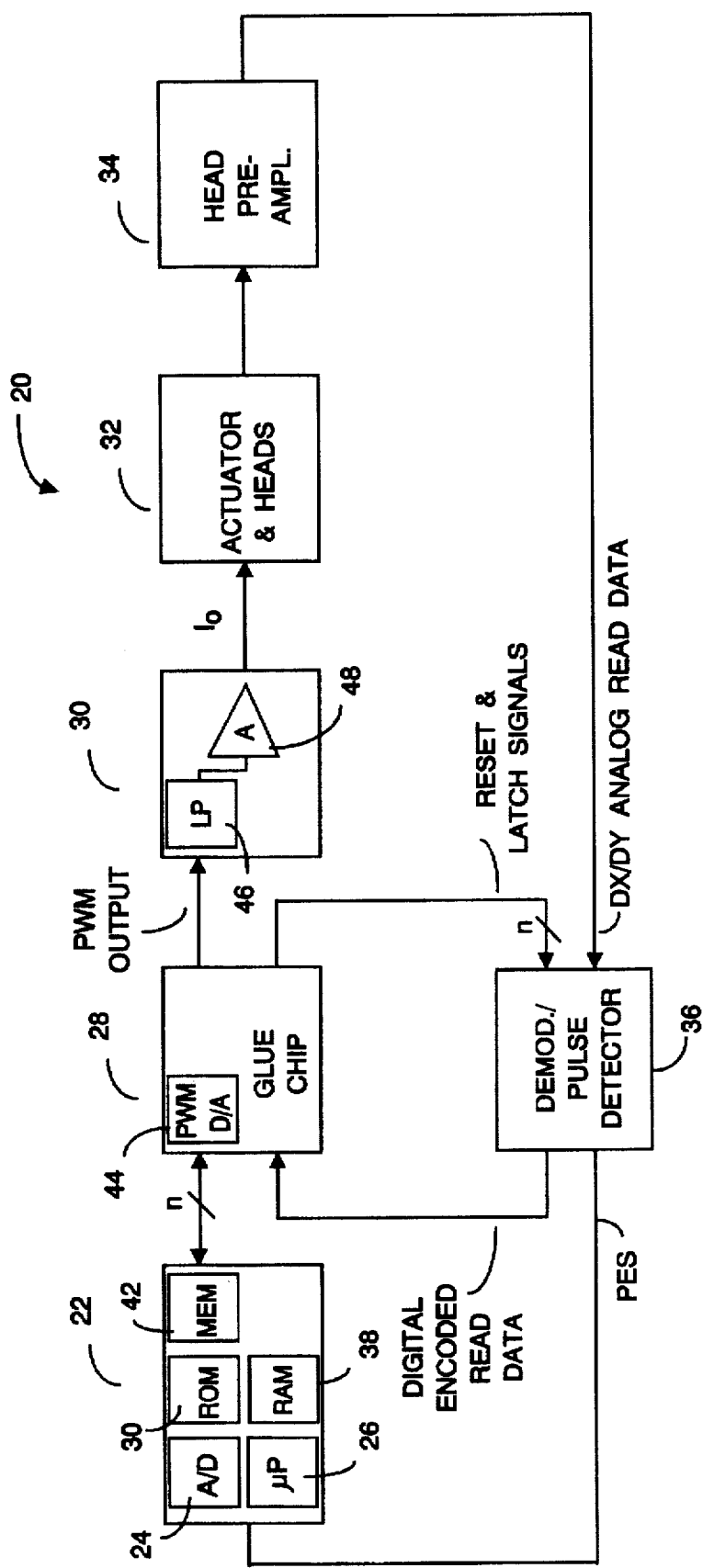
FIG. 2 is a block diagram of hardware implementing a sampled-data read/write head positioning servo system, according to the present invention.

FIG. 2 is a simplified block diagram of a control system 20, according to the present invention, which preferably is used to position read/write heads such as 12U, 12L, 14U, 14L in a magnetic disc drive 2, such has been described with respect to FIG. 1. For ease of description, assume that the disc drive unit 2 in FIG. 1 includes a single rotating disc 4, from which heads 12U, 12L access data, including positional servo data embedded in the various tracks on the disc. (Of course, the present invention may be used with servo pattern types other than sector servo patterns.)

With reference to FIG. 1 and FIG. 2, as the actuator assembly 10 moves the heads 12U, 12L across disc 4, data, including servo data embedded in the disc, are read. The data produces an analog read-back signal in the selected head, which signal is depicted in FIG. 2 as element 32. This analog signal for the selected read/write head is amplified by a head pre-amplifier 34, and is converted to digital encoded read data by a demodulator/pulse detector-digital controller 36.

In typical digital servo fashion, controller 36 reads a measurement from the heads that consists of a coarse value (such as track crossing or Gray code information), and a fine value (such as position error signal "PES", derived from demodulating pre-recorded servo information on the disc). The position error signal PES indicates the position error of the read/write head away from the nearest track centerline.

In contrast to prior art systems wherein a dedicated disc surface holds pre-recorded servo data, the present invention requires servo data written onto the discs between read/write data. As such, deriving track crossing information from the PES is not feasible because the heads may cross many tracks between PES samples. Thus, according to the present invention, track crossing information is obtained from reading a Gray code containing the absolute track address.

As shown by FIG. 2, digital encoded read data is coupled to a glue chip module 28 that includes a pulse width modulation ("PWM") digital-to-analog ("D/A") converter ("DAC") 44 and servo data logic unit. Glue chip module 28 detects the DC erase field from the digital encoded read data provided by the demodulator pulse detector 36. When this field is found, glue chip 28 generates signals that sequentially reset (e.g., discharge) and then charge capacitors within demodulator 36, which capacitors then latch and hold the corresponding average burst signals. The PES is proportional to the difference between the average amplitude of adjacent burst signals as measured track-to-track, and as such is proportional to the distance from the centerline of the nearest track on the disc. The PES is then output from demodulator/pulse detector 36 to a microcontroller unit 22, wherein an analog-to-digital converter 24 ("A/D" or "ADC") digitizes the PES signal for signal processing.

The glue chip 28 also generates servo interrupt signals for microcontroller unit 22, and further generates sector mark data containing guardband and index information. Glue chip modules are known to those skilled in the relevant art, and provide control functions that include power-on reset, chip select logic, write fault logic, spindle speed control, dual PWM digital-to-analog converted outputs, as well as embedded servo decode functions.

As further shown by FIG. 2, PWM data from glue chip 28 is coupled to unit 30, where the data are low-pass filtered by filter 46 and amplified by amplifier 48. The resultant output current $I_c$ is coupled to drive the actuator and heads, collectively 32.

Preferably, the present invention operates under control of the microcontroller 22, which digitally executes the algorithms disclosed herein. Microcontroller 22 typically includes a digital signal processing-based microprocessor 26, read-only memory ("ROM") 38, random access memory ("RAM") 40, data memory 42, as well as the previously noted A/D converter 24.

Of course, applicant's algorithms may be implemented with a number of microcontrollers/microprocessors whose computational speed is preferably commensurate with the servo sampling rate. As will be described, applicant's algorithm can improve control system performance under the constraint of a low servo sampling rate. The result is a higher servo bandwidth, faster seek time, and better disturbance rejection.

Microcontroller 22 preferably communicates with glue chip 28 via an n-bit wide multiplexed address/data buss. The microprocessor 26 reads the Gray code provided by the glue chip 28, and reads the A/D digitized PES data provided by the demodulator pulse detector 36.

According to the present invention, microprocessor 26 further computes the estimator, whereupon microcontroller 22 provides the control signal to the PWM DAC 44 within the glue chip 28. As noted, the PWM output is filtered by a low-pass filter 46 within unit 30 to remove switching noise components. The filter output is then amplified by a power amplifier 48, also within unit 30, to provide current drive $I_o$ to the actuator assembly 32.

Figure 3:
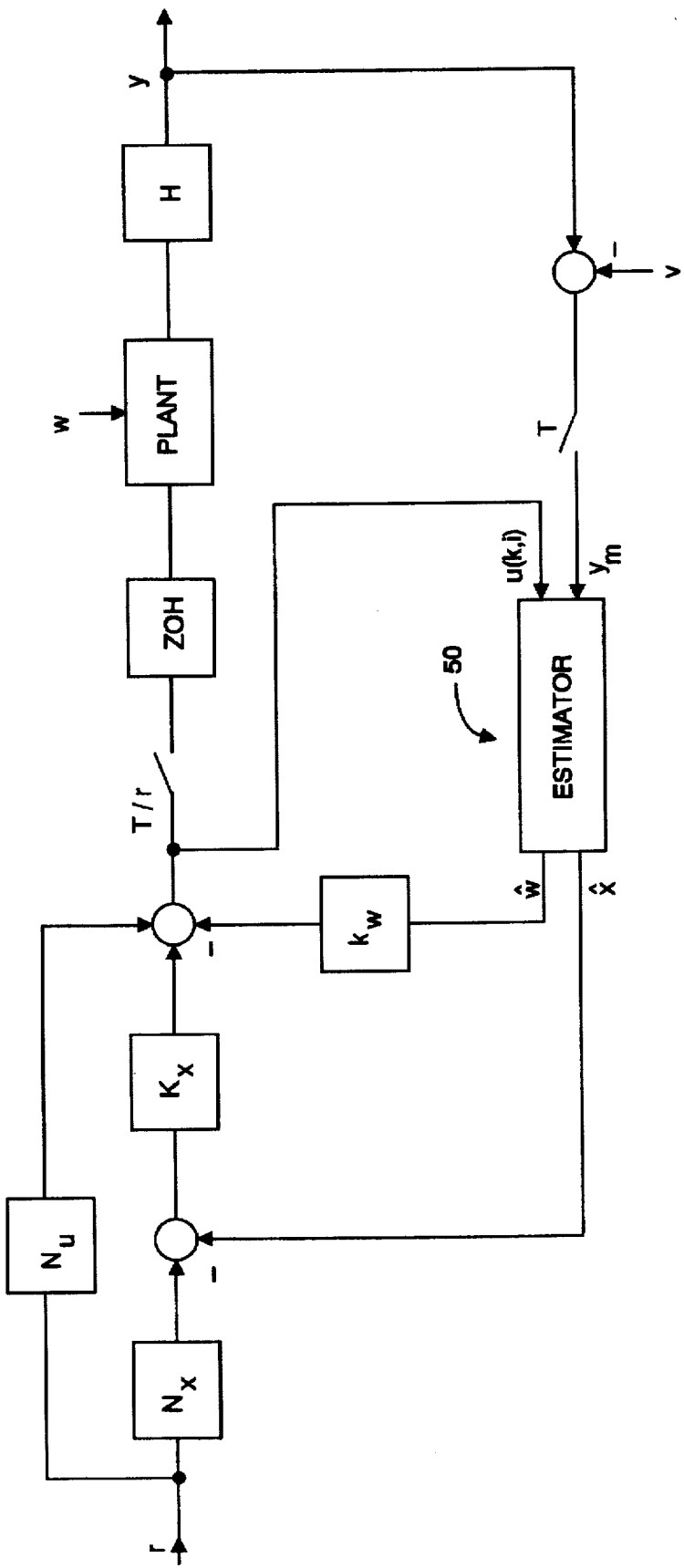
FIG. 3 is a block diagram of a multirate system for controlling read/write head positioning in a magnetic disc storage unit, according to the present invention.

FIG. 3 depicts the servo block diagram for a digital control system, according to the present invention, wherein the following nomenclature is used:

$X_{target}$=target track on disc media
$\hat{x}_1$=estimated position in tracks
$\hat{x}_2$=estimated velocity in tracks per sample period
$\hat{w}=\hat{x}_3$=estimated bias in D/A converter counts
$y_m$=position measurement, calculated from Gray code and PES in tracks
w=disturbance input
v=measurement noise input In FIG. 3, estimator 50 estimates the state of the plant, including selected head position and velocity, and total DC bias reflected at the plant input. Position measurement $Y_m$ is a single number preferably formed from the Gray code value and the digitized PES value, which latter two values may in practice be contaminated with noise components. In the present invention, even though head position is measured, head position is filtered by using an estimated state to eliminate some of the measurement noise. This method qualifies head measurement and replaces erroneous measurements.

The predicted estimated states are a function of the current estimated states, the current multirate control values, and the last control value. The present invention includes the last control value to compensate for the computational delay between the time the measurement is available, and the time the control signal is actually output. In practice, estimator model complexity may be constrained by limited microprocessor bandwidth, often due to multitasking or low speed microprocessors. According to the present invention, the delay may also include system phase lags, not accounted for in the estimator model, perhaps due to bandwidth-imposed complexity constrain.

The model for computing the predicted states is based on the model for the plant, and includes the ADC 24, D/A or PWM unit 28, low-pass filter-power amplifier unit 30, actuator and head unit 32, 34, and the demodulator unit 36.

In the present invention, the estimator 50 is described by equations that include measurement and time update data, wherein time update uses a multirate model that includes the effect of the computation delay (as suggested by the derivation of the plant model).

In typical disc drives, the actuator is subject to low frequency bias components that can move the actuator away from the desired target position during seek and track-following modes. Without limitation, contribution to such bias can include force from the flexible cable that is attached to the actuator coil, actuator bearing friction, windage due to air circulating inside the head disc assembly, gravitational force on the carriage assembly (especially where the actuator is imperfectly balanced). Further, electronic offset in the system (e.g., from amplifier 34) can cause a constant current to be applied to the actuator with zero control effort from the controller. For these reasons, the present invention includes a bias estimator to account for total DC bias seen by the plant.

The bias that the dynamic system is subject to is estimated by the estimator, and the estimated bias is subtracted from the control value to remove or at least reduce the effect of the bias. Applicant's control update rate is a multiple of the measurement sample rate. The control value for the multirate digital control system described herein is updated at a rate r per sample period, where r is a positive integer greater than 1.

A detailed description of an estimator and controller for a multirate design with multirate control update rate r is contained in applicant's publication "The Design and Modeling of Multirate Digital Control Systems for Disc Drive Applications", IEEE 0-7803-1223-6/93 (1993). Applicant refers to and incorporates herein by reference said publication.

Applicant's estimator is described by the following equations, which include both measurement update and time update. The time update uses a multirate model that includes the effect of the computation delay, as suggested by the derivation of the plant model. As noted, a bias estimator is also included to account for the total DC bias seen by the plant. Most disc drives require a bias estimator because of the bias force from the actuator flex cable, gravitational force on the carriage assembly (if the actuator is not well balanced), and electronic offsets such as from the power amplifier.

Let $\hat{x}(k)$ and $\hat{w}(k)$ denote the current estimate of the analog plant state and the bias, which is to say, the estimate after measurement update. Let $\bar{x}(k)$ and $\bar{w}(k)$ denote the corresponding prediction estimate. The measurement update equations are given by:

$\hat{x}(k)=\bar{x}(k)+L_x\{y_m(k)-H\bar{x}(k)\}$
$\hat{w}(k)=\bar{w}(k)+L_w\{y_m(k)-H\bar{x}(k)\}$ where $L_x$ and $L_w$ are the plant estimator gain and the bias estimator gain.

The measurement $y_m(k)$ represents the plant output y(k) but corrupted by v(k), which could represent measurement noise or track runout: $y_m(k)=y(k)-v(k)$.

The time update equations are given by:

$$\bar{x}(k+1) = A\hat{x}(k) + \sum_{i=0}^{r-1} B_i u(k, i) + B_d u(k, -1) + B_w \hat{w}(k)$$

$$\bar{w}(k+1) = \hat{w}(k).$$

Using the estimator described above, it can be shown that the control system will reject constant bias input even if the bias enters the plant non-collocatedly with the control. Therefore, the steady state output error remains zero.

Let the state to be estimated be defined as $x_e=[x'\ w]'$, whereupon the estimator can be written as follows:

$$\hat{x}_e(k) = \bar{x}_e(k) + L\{y_m(k) - c_e\bar{x}_e(k)\}$$

$$\bar{x}_e(k+1) = A_e\hat{x}_e(k) + \sum_{i=0}^{r-1} B_{ei} u(k, i) + B_{ed} u(k, -1)$$

where $$A_e = \begin{bmatrix} A & B_w \\ 0 & 1 \end{bmatrix}$$

$$B_{ei} = \begin{bmatrix} B_i \\ 0 \end{bmatrix} \text{ for } i = 0, 1, \ldots, r-1$$

$$B_{ed} = \begin{bmatrix} B_d \\ 0 \end{bmatrix}$$

$C_e = [H\ 0]$
$L = [Lx'\ Lw]'.$

The above estimator model implies that the estimator error is not excitable from the reference input. The dynamics of the estimator error, $\tilde{x}_e(k)=x_e(k)-\hat{x}_e(k)$, are governed by the single rate relationship:

$$\tilde{x}_e(k+1)=(A_3-LC_eA_e)\tilde{x}_e(k).$$

For the single output case, if $\{C_eA_e\}$ is observable, then estimator gain L may be uniquely determined by eigenvalue assignment. Therefore, the estimator gain can be designed using single rate linear estimation methods.

The estimator provides state feedback and greater immunity against measurement noise, servo defects, and Gray code detection uncertainty. The time-update position estimate qualifies the measurement and replaces erroneous measurements.

Furthermore, the output prediction error of the estimator $$y_m(k)-c_e e_e(k)$$

is a diagnostic output. For example, if the magnitude of this signal continues to increase substantially then a failure of the servo system has occurred.

The multirate control design, which includes the effect of computation delay and bias estimation, is given by:

$$u(k,i)=-K_i \hat{x}_e(k)-k_{di} u(k,-1)+N_i x_{target} \text{ for } i=0, 1, \ldots r-1$$

A simple approach is to design the control gains as though the state is available at the multirate sample T/r, in which case standard single rate system techniques such as pole placement may be used to uniquely determine the control gains. The estimator can estimate the state at the control update rate $$x(k,i)=x(kT+iT/r)$$

and the same control gains can be used for all the control updates. The following equations illustrate this method for r=2, e.g., two updates of the control signal per one sample period.

$$u(k,0)=-K\hat{x}_e(k)-k_d u(k,-1)-Nx_{target}$$

$$u(k,1)=-K\bar{x}_e(k,1)-k_d u(k,0)-Nx_{target}$$

where $$\bar{x}_e(k,1)=\bar{x}_e(kt+T/2)$$

The estimator, control, and plant all include the effect of the delay, whereupon the separation principle is applicable for a multirate closed-loop system according to the present invention. This permits the control poles and the estimator poles to be designed separately, with the closed-loop poles being the combined control poles and estimator poles.

In designing a multirate servo system according to the present invention, a model of the closed-loop system is created by combining the equations governing the plant, the estimator, and the control law given above. The multirate system can be represented by a multiple input multiple output single-rate formulation:

$$x_s(k+1)=A_s x_s(k)+B_s u_s(k)$$

$$y_s(k)=C_s x_s(k)+D_s u_s(k)$$

where $$x_s(k)=[x_p(k)'\xi]'$$

$$\xi(k)=x_e(k)-Ly_m(k)$$

$$u_s(k)=x_{target} v(k) w(k)]'.$$

The system matrices are given by:

$$A_s = \begin{bmatrix} A_p - M_{p1}LC_p - M_{p2}C_d & -M_{p1} \\ M(M_{e1}LC_p + M_{e2}C_d) & MM_{e1} \end{bmatrix}$$

$$B_s = \begin{bmatrix} M_{p3} & M_{p1}L & B_{pw} \\ MM_{e3} & -MM_{e1}L & 0 \end{bmatrix}$$

where:

$$M = I - L \cdot C_e$$

$$M_{p1} = \sum_{i=0}^{r-1} B_p K_i$$

$$M_{p2} = \sum_{i=0}^{r-1} B_p k_{di}$$

$$M_{p3} = \sum_{i=0}^{r-1} B_p N_i$$

$$M_{e1} = A_e - \sum_{i=0}^{r-1} B_{ei} K_i$$

$$M_{e2} = B_{ed} - \sum_{i=0}^{r-1} B_{ei} k_{di}$$

$$M_{e3} = \sum_{i=0}^{r-1} B_{ei} N_i$$

$$u(k, -1) = C_d x_p(k).$$

To minimize computation delay and phase loss, applicant's design equations are rearranged to pre-calculate for the next sample, which allows the control signal to be output to the D/A converter with minimum delay. This is accomplished by writing the control equations in terms of the current measurement and the predicted estimate.

Figure 4:
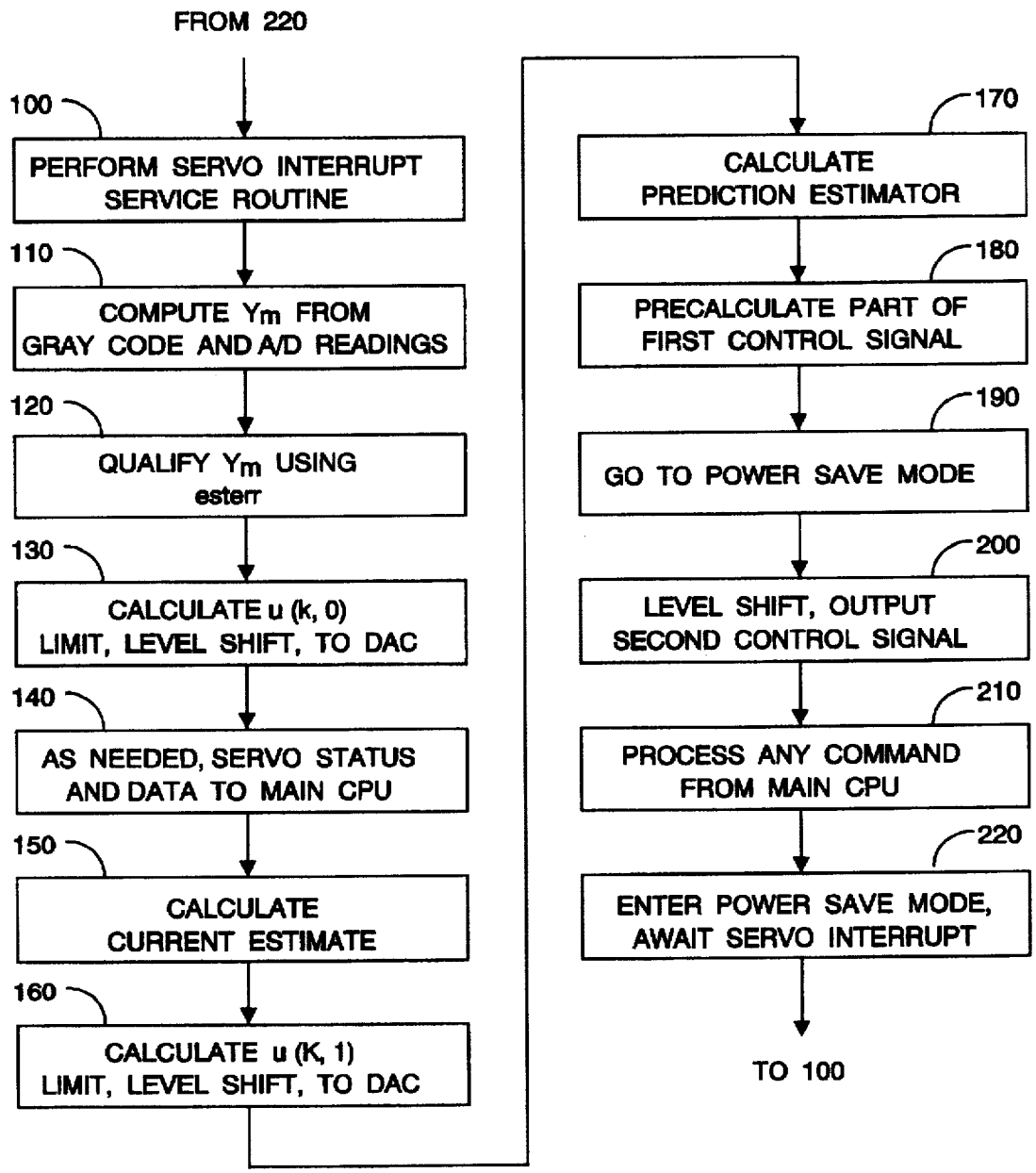
FIG. 4 is a flow diagram of an algorithm for controlling read/write head positioning in a magnetic disc storage unit, according to the present invention.

FIG. 4 depicts the preferred implementation of applicant's algorithm. At step 100, a servo interrupt service routine is executed.

At step 110, position measurement $Y_m$ is calculated from the measurement of the Gray code and A/D converter readings. In step 110, the output prediction error, esterr, is computed, to qualify the measurement.

At step 120, the position measurement $y_m$ is qualified, using the output prediction error, esterr.

At step 130, the first control value u(k,0) is determined from the relationship:

$$u(k,0)=k_e \cdot esterr + pre\_res$$

where pre_res is a pre-calculation result based upon predicted states, and where $k_e$ is an estimator error gain constant. Once determined, u(k,0) is then limited, level shifted, and output as a signal to the D/A converter.

At step 140, the servo status and data are send to the main processor, if needed.

At step 150, the current estimate is calculated from the following relationships:

$$pos\_pre:=pos\_pre+l_1 \cdot esterr$$

$$vel\_pre:=vel\_pre+l_2 \cdot esterr$$

$$bias\_pre:=bias\_pre+l_3 \cdot esterr$$

where pos_pre, vel_pre, and bias_pre are predicted head position, head velocity and head bias-contribution values, and wherein $l_1$, $l_2$, and $l_3$ are estimator gains.

At step 160, the second control value u(k, 1) is calculated and limited, using the relationship:

$$u(k,1) = k_{u21} \cdot (pos\_pre-r) + k_{u22} \cdot vel_{13}pre + k_{u23} \cdot bias\_pre + k_{ud2} \cdot u(k,-1)$$

where co-efficients $k_{upq}$ represent constants that are gain terms.

At step 170, the prediction estimator is calculated, as follows:

$$pos\_pre := pos\_pre + a_{e12} \cdot vel\_pre + a_{e13} \cdot bias\_pre +$$
$$b_{e11} \cdot u(k, 0) + b_{e21} \cdot u(k, 1) + b_{ed1} \cdot u(k, -1) +$$
$$b_{ed1} \cdot u(k, -1)$$

$$vel\_pre := vel\_pre + a_{v23} \cdot bias\_pre + b_{e12} \cdot u(k,0) + b_{e22} \cdot u(k,1) + b_{ed2} \cdot u(k,-1)$$

$$u(k,-1) := u(k,1)$$

Those skilled in the relevant art will appreciate that all of the above constants may be calculated from the equations derived earlier herein.

At step 180, part of the first control signal is pre-calculated, which advantageously results in but one multiplication step and one additional step required to complete the calculation:

$$pre\_res = k_{u11} \cdot (pos\_pre - x_{target}) + k_{u12} \cdot vel\_pre + k_{u13} \cdot bias\_pre + k_{ud1} \cdot u(k,1)$$

At step 190, the power save mode is entered.

At step 200, the second control is level shifted and output to the D/A converter after expiration of an appropriate delay.

At step 210, if present, a command from the main processor is at this time process, and at step 220, the power save mode is entered, and the system returns to step 100 to await a servo interrupt.

Note that the above algorithm can be modified to be implemented in different configurations. One example of such variation is by replacing the output prediction error (esterr) with the measurement ($Y_m$) in step 4. Another example is that the calculations of the current estimate in step 6(a) do not have to be calculated in which case the current estimate is not available.

Modifications and variations may be made to the disclosed embodiments without departing from the subject and spirit of the invention as defined by the following claims.

What is claimed is:

1. A multirate digital control system for use with a system having a linear transfer function, the control system comprising:

an estimator, coupled to receive sampled sensed positional information at a sampling rate, that outputs a measured control signal representing measured position, and that outputs at least one estimated control signal representing estimated position, said measured and estimated control signals being output at a rate that is a multiple r of the sampling rate, wherein the estimator outputs r-1 estimated control signals, wherein r≧2 and computational delay means for introducing a desired delay in said measured and estimated output signals, said desired delay compensating at least in part for time necessary to compute said output signals, said estimator determining values for the measured and estimated control signals at the sampling rate.

2. The multirate digital control system of claim 1, wherein r=2.

3. The multirate digital control system of claim 1, further including bias means for compensating for system bias present in said system.

4. The multirate digital control system of claim 1, wherein said system having a linear transfer function is an actuator system that positions at least one read/write head adjacent a rotating magnetic storage disc for placement and retrieval of information storable thereon, and wherein said sampled sensed positional information is stored on said disc.

5. In a hard disc storage system that includes a disc with positional information gored thereon, at least one read/write head for placement and retrieval of information storage on said disc, and an actuator system having a linear transfer function that positions said at least one read/write head adjacent said disc, a multirate digital control system for controlling said actuator system, said multirate digital control system comprising:

an estimator, coupled to receive sampled sensed positional information stored on said disc, and outputting a first control signal representing measured read/write head position, and outputting at least one second control signal representing estimated read/write head position, said first and second control signals being output a multiple r of a rate of sampling said sensed positional information, wherein r≧2, wherein the estimator outputs r-1 second control signals, computational delay means for introducing a desired delay in said first and second output signals, said desired delay compensating at least in part for time necessary to compute said output signals, wherein said estimator determining values for the first and second control signals at the rate of sampling said sensed positional information.

6. The multirate digital control system of claim 5, further including bias means for compensating for system bias present in said actuator system.

7. A multirate digitally controllable hard disc storage system, including:

a rotatable disc with positional information stored thereon;

a read/write head for placement and retrieval of information storable on said disc;

an actuator system having a linear transfer that positions said at least one read/write head adjacent said disc; and a multirate digital control system for controlling said actuator system, said multirate digital control system comprising:

an estimator, coupled to receive sampled sensed positional information stored on said disc, and outputting a first control signal representing measured read/write head position, and outputting at least one second control signal representing estimated read/write head position; said first and second control signals being output at a multiple r of a rate of sampling said sensed positional information, wherein r≧2, wherein the estimator outputs r-1 second control signals, and computational delay means for introducing a desired delay in said first and second output signals, said desired delay compensating at least in part for time necessary to compute said output signals, said estimator determining values for the first and second control signals at the rate of sampling said sensed positional information.

8. In a digital control system for use with a system having a linear transfer function, a method for generating actual and predictive data for positioning an element in the system based upon sampling sensed positional information stored in the system, the method comprising the following steps:

(a) sampling sensed positional information at a sampling rate and computing a position measurement $Y_m$;

(b) computing an output prediction error esterr;

(c) qualifying said $Y_m$ measurement computed at step (a) with said output prediction error esterr computed at step (b);

(d) calculating a first control value u(k,0) based upon esterr, as computed at step (b), and a precalculation based upon predicted states and generating a first control signal based on the first control value for repositioning the element in said system as needed;

(e) calculating a current estimate using said esterr as computed at step (b);

(f) calculating a second control value u(k,1), using said current estimate calculated at step (e);

(g) calculating a prediction estimator, using said current estimate calculated at step (e) and using said second control value calculated at step (f); said steps (f) and (g) including introducing a desired delay in said first and second output signals, said desired delay compensating at least in part for time necessary to compute said first control value and said prediction estimator; and (h) generating a second control signal based on the second control value after an appropriate delay for repositioning the element in said system as needed.

9. The method of claim 8, wherein at step (d), said first control value u(k,0) is defined as $k_e$·esterr+pre_res, where $k_e$ is an estimator error gain constant, and pre_res is a pre-calculation result based upon predicted states.

10. The method of claim 8, wherein at step (e), said current estimate is defined as:

$$pos\_pre := pos\_pre + l_1 \cdot esterr$$
$$vel\_pre := vel\_pre + l_2 \cdot esterr$$
$$bias\_pre := bias\_pre + l_3 \cdot esterr$$

where pos_pre, vel_pre, and bias_pre are predicted head position, head velocity and head bias-contribution values, and wherein $l_1$, $l_2$, and $l_3$ are estimator gains.

11. The method of claim 8, wherein at step (f), said second control value is defined as:

$$u(k,1) = k_{u21} \cdot (pos\_pre - x_{target}) + k_{u22} \cdot vel\_pre + k_{u23} \cdot bias\_pre + k_{ud2} \cdot u(k,-1)$$

where co-efficients $k_{upq}$ represent gain term constants.

12. The method of claim 8, wherein at step (g), said prediction estimator is defined as:

$$pos\_pre\ =\ pos\_pre + a_{e12} \cdot vel\_pre + a_{e13} \cdot bias\_pre +$$
$$b_{e11} \cdot u(k,0) + b_{e21} \cdot u(k,1) + b_{e11} \cdot u(k,0) +$$
$$b_{ed1} \cdot u(k,-1)$$

$$vel\_pre\ =\ vel\_pre + a_{e23} \cdot bias\_pre + b_{e12} \cdot u(k,0) +$$
$$b_{e22} \cdot u(k,1) + b_{ed2} \cdot u(k,-1)$$
$$u(k,-1)\ =\ u(k,1).$$

13. The method of claim 8, wherein after step (g), at least a portion of said first control signal is pre-calculated.

14. The method of claim 13, wherein pre-calculating at least a portion of said first control signal permits a single multiplication step and a single addition step to complete the following calculation:

$$pre\_res = k_{u11} \cdot (pos\_pre - x_{target}) + k_{u12} \cdot vel\_pre + k_{u13} \cdot bias\_pre + k_{ud1} \cdot u(k,1).$$

15. The method of claim 8, wherein said position measurement ym is sampled at a first sampling rate, and wherein said first and second control values are a multiple r of said first sampling rate.

16. The method of claim 8, further including the step of compensating for system bias present in said system.

17. The method of claim 8, wherein said linear transfer function system is a hard disc storage system, and wherein said method positions a transducer over a storage disc in said hard disc storage system.

18. A method as in claim 8, wherein the appropriate delay is based on a multirate r of the sampling rate.

19. For use with a hard disc storage system that includes a disc with positional information stored thereon, at least one read/write head for placement and retrieval of information storable on said disc, and an actuator system having a linear transfer function that positions said at least one read/write head adjacent said disc, a method for controlling said actuator system, said method comprising the following steps:

(a) computing and outputting a position measurement of said read/write head at a sampling rate, said position measurement using samples of said positional information stored on said disc;

(b) computing and outputting a prediction error associated with position of said read/write head at the sampling rate;

(c) qualifying said measurement computed at step (a) with said output prediction error computed at step (b);

(d) calculating a first control value based upon said output prediction error as computed at step (b), and a precalculation based upon predicted states, and applying the first control value to reposition said read/write head;

(e) calculating a current estimate using said output prediction error as computed at step (b);

(f) calculating a second control value using said current estimate calculated at step (e);

(g) calculating a prediction estimator, using said current estimate calculated at step (e) and using said second control value calculated at step (f); said steps (f) and (g) including introducing a desired delay in said first and second output signals, said desired delay compensating at least in part for time necessary to compute said first control value and said prediction estimator; and (h) applying the second control value to reposition said read/write head after an appropriate delay.

20. The method of claim 19, wherein after step (g), at least a portion of said first control value is pre-calculated.

21. The method of claim 19, further including the step of compensating for system bias present in said actuator system.

22. A method as in claim 19, wherein the appropriate delay is based on a multirate r of the sampling rate.

* * * * *